US011950582B2

(12) United States Patent
Salter et al.

(10) Patent No.: US 11,950,582 B2
(45) Date of Patent: Apr. 9, 2024

(54) PET BOWL HAVING INTEGRATED SENSING

(71) Applicant: Ford Global Technologies, LLC, Dearborn, MI (US)

(72) Inventors: Stuart C. Salter, White Lake, MI (US); Annette Lynn Huebner, Highland, MI (US); Marguerite Lynn Kimball, Brighton, MI (US); Hussein Berry, Dearborn, MI (US); John Robert Van Wiemeersch, Novi, MI (US); Pietro Buttolo, Dearborn Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 717 days.

(21) Appl. No.: 16/952,151

(22) Filed: Nov. 19, 2020

(65) Prior Publication Data

US 2022/0151202 A1    May 19, 2022

(51) Int. Cl.
*A01K 7/02* (2006.01)
*B60N 3/10* (2006.01)
*B60N 3/18* (2006.01)
*H04B 1/02* (2006.01)

(52) U.S. Cl.
CPC .............. *A01K 7/027* (2013.01); *B60N 3/104* (2013.01); *B60N 3/18* (2013.01); *H04B 1/02* (2013.01)

(58) Field of Classification Search
CPC . A01K 7/027; A01K 7/00; A01K 7/02; A01K 29/00; A01K 29/005; B60N 3/104; B60N 3/18
See application file for complete search history.

(56) References Cited

U.S. PATENT DOCUMENTS

| | | | |
|---|---|---|---|
| 5,724,920 A | 3/1998 | Meisman et al. | |
| 7,527,017 B1 | 5/2009 | Cribb | |
| 7,600,486 B2 | 10/2009 | Ellis | |
| 8,100,084 B1 | 1/2012 | Abramson | |
| 8,117,991 B1 | 2/2012 | Civitillo | |
| 8,146,534 B1 | 4/2012 | Robertson | |
| 8,258,932 B2 | 9/2012 | Wahlstrom | |
| 8,768,292 B2 | 7/2014 | Welch | |
| 9,227,484 B1 | 1/2016 | Justice et al. | |

(Continued)

FOREIGN PATENT DOCUMENTS

| | | | |
|---|---|---|---|
| CN | 109839929 A | | 6/2019 |
| JP | 2006219009 A | | 8/2006 |
| KR | 20160135872 A | * | 11/2016 |

*Primary Examiner* — Peter M Poon
*Assistant Examiner* — Hae Rie Jessica Byun
(74) *Attorney, Agent, or Firm* — Vichit Chea; Price Heneveld LLP

(57) ABSTRACT

A pet bowl is provided that comprises a housing defining a water container, a proximity sensor located proximate to the water container, the proximity sensor having conductive circuitry comprising a first circuit made of a first metal and a second circuit made of a dissimilar second metal, and a controller processing signals received from the proximity sensor, the controller selectively switching the conductive circuitry between a first configuration operating as the proximity sensor to sense water contained in the container and a second configuration operating as a thermocouple to sense temperature proximate to the water container.

20 Claims, 9 Drawing Sheets

(56) References Cited

U.S. PATENT DOCUMENTS

| | | |
|---|---|---|
| 9,392,770 B2 | 7/2016 | Almeida |
| 9,463,805 B2 | 10/2016 | Kirsch et al. |
| 9,637,085 B2 | 5/2017 | Sanchez Huipio et al. |
| 9,654,103 B2 | 5/2017 | Buttolo et al. |
| 9,845,050 B1 | 12/2017 | Garza et al. |
| 9,975,481 B2 | 5/2018 | Hatton et al. |
| 10,091,972 B1 | 10/2018 | Jensen et al. |
| 10,115,029 B1 | 10/2018 | Day et al. |
| 10,303,961 B1 | 5/2019 | Stoffel et al. |
| 10,352,759 B1 * | 7/2019 | Jensen .................. A47G 23/12 |
| 10,649,061 B2 | 5/2020 | Bjorkengren |
| 10,742,969 B1 | 8/2020 | Rohatgi et al. |
| 10,785,604 B1 | 9/2020 | Kumar et al. |
| 11,067,452 B1 * | 7/2021 | Lee ....................... G01J 5/0275 |
| 11,562,550 B1 | 1/2023 | Asghar et al. |
| 2002/0169583 A1 | 11/2002 | Gutta et al. |
| 2007/0131177 A1 | 6/2007 | Perkitny |
| 2008/0246318 A1 | 10/2008 | Bothe et al. |
| 2010/0305816 A1 | 12/2010 | Orlewski |
| 2014/0309806 A1 | 10/2014 | Ricci |
| 2014/0309862 A1 | 10/2014 | Ricci |
| 2014/0310739 A1 | 10/2014 | Ricci et al. |
| 2014/0319895 A1 | 10/2014 | Lange-Mao et al. |
| 2015/0342143 A1 | 12/2015 | Stewart |
| 2016/0070527 A1 | 3/2016 | Ricci |
| 2016/0227732 A1 | 8/2016 | Pompey |
| 2016/0272112 A1 | 9/2016 | DeGrazia et al. |
| 2016/0357262 A1 | 12/2016 | Ansari |
| 2018/0194194 A1 | 7/2018 | Lyubich et al. |
| 2019/0016235 A1 | 1/2019 | Parida et al. |
| 2019/0118603 A1 | 4/2019 | Feit |
| 2019/0279447 A1 | 9/2019 | Ricci |
| 2019/0389352 A1 | 12/2019 | Koller et al. |
| 2020/0085004 A1 * | 3/2020 | Yoo ........................ A01K 7/025 |
| 2020/0130702 A1 | 4/2020 | Ferreira et al. |
| 2020/0205381 A1 * | 7/2020 | Wernimont ............ G16H 50/30 |
| 2020/0307483 A1 | 10/2020 | Topf et al. |
| 2020/0383580 A1 | 12/2020 | Shouldice et al. |
| 2021/0232642 A1 | 7/2021 | Ricci |
| 2022/0112760 A1 | 4/2022 | Demele et al. |
| 2023/0106673 A1 | 4/2023 | Asghar et al. |
| 2023/0230121 A1 | 7/2023 | Chintakindi et al. |

* cited by examiner

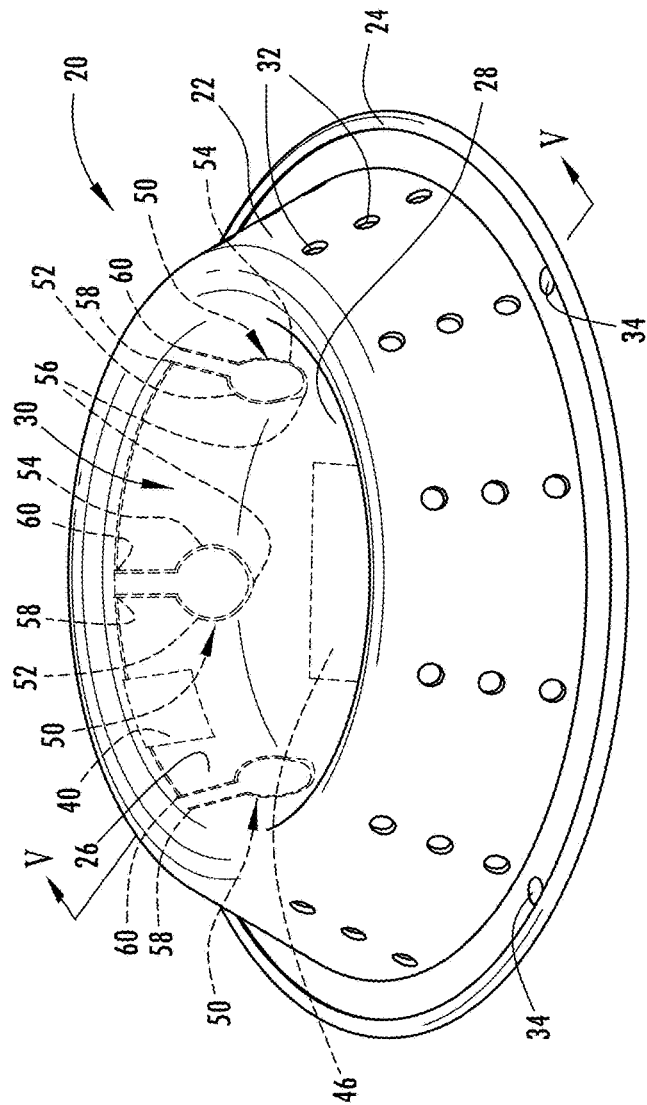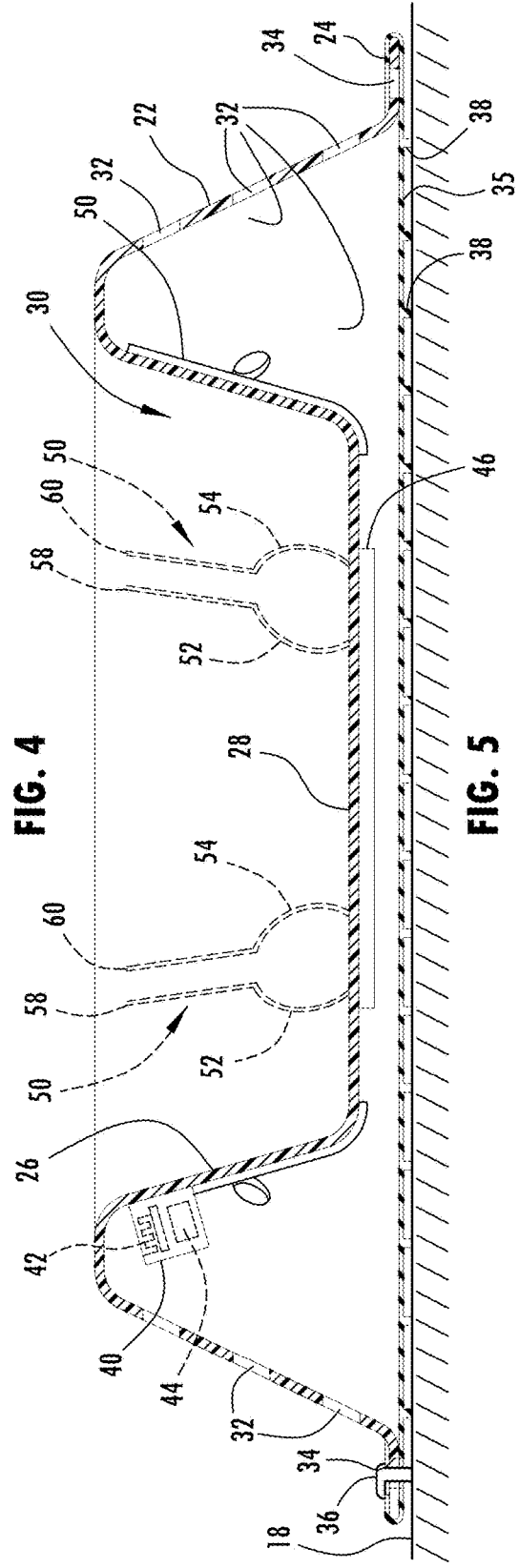

PET BOWL HAVING INTEGRATED SENSING

FIELD OF THE DISCLOSURE

The present disclosure generally relates to pet bowls, and more particularly relates to pet bowls that sense the content in the pet bowl and/or communicate pet bowl information.

BACKGROUND OF THE DISCLOSURE

Pet bowls are commonly used to provide food and water for pets such as dogs, cats and other animals. Pets are frequently transported within motor vehicles. When traveling in a vehicle, particularly on long trips, a pet owner may provide food and water for a pet. Portable pet bowls may be transported within the vehicle, however, it may be desirable to provide for enhanced features in pet bowls, particularly when utilized within a vehicle.

SUMMARY OF THE DISCLOSURE

According to a first aspect of the present disclosure, a pet bowl is provided. The pet bowl includes a housing defining a container, a proximity sensor located proximate to the container, the proximity sensor having conductive circuitry comprising a first circuit made of a first metal and a second circuit made of a dissimilar second metal, and a controller processing signals received from the proximity sensor, the controller selectively switching the conductive circuitry between a first configuration operating as the proximity sensor to sense content contained in the container and a second configuration operating as a thermocouple to sense temperature proximate to the container.

Embodiments of the first aspect of the disclosure can include any one or a combination of the following features:
- the container comprises thermally conductive material;
- the thermally conductive material comprises thermally conductive plastic;
- a wireless transmitter for communicating with a controller onboard a vehicle;
- the wireless transmitter comprises an RF transmitter;
- one or more batteries for providing electrical power to the controller and proximity sensor;
- the proximity sensor comprises a capacitive sensor;
- the temperature is sensed at a junction of the first and second circuits;
- the controller generates an output based on at least one of a sensed water level and temperature;
- the output is indicative of at least one of the sensed water level and temperature; and
- the output controls a heater or cooler to adjust the temperature of the water in the container.

According to a second aspect of the present disclosure, a pet bowl for use on a vehicle is provided. The pet bowl includes a housing defining a water container, a capacitive sensor located proximate to the water container, the capacitive sensor having conductive circuitry comprising a first circuit made of a first metal and a second circuit made of a dissimilar second metal, and a controller processing signals received from the capacitive sensor, the controller selectively switching the conductive circuitry between a first configuration operating as the capacitive sensor to sense water level in the water container and a second configuration operating as a thermocouple to sense temperature proximate to the water container.

Embodiments of the second aspect of the disclosure can include any one or a combination of the following features:
- the water container comprises thermally conductive material;
- the thermally conductive material comprises thermally conductive plastic;
- a wireless transmitter for communicating with a controller onboard the vehicle;
- the wireless transmitter comprises an RF transmitter;
- one or more batteries for providing electrical power to the controller and proximity sensor;
- the temperature is sensed at a junction of the first and second circuits;
- the controller generates an output based on at least one of the sensed water level and temperature; and
- the output controls a heater or cooler to adjust the temperature of the water.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 4 is a perspective view of a pet bowl that may be used within the vehicle, according to one embodiment;

FIG. 5 is a cross-sectional view of the pet bowl taken through line V-V of FIG. 4;

DETAILED DESCRIPTION OF THE PREFERRED EMBODIMENTS

As required, detailed embodiments of the present disclosure are disclosed herein; however, it is to be understood that the disclosed embodiments are merely exemplary of the invention that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present invention.

Figure 1:
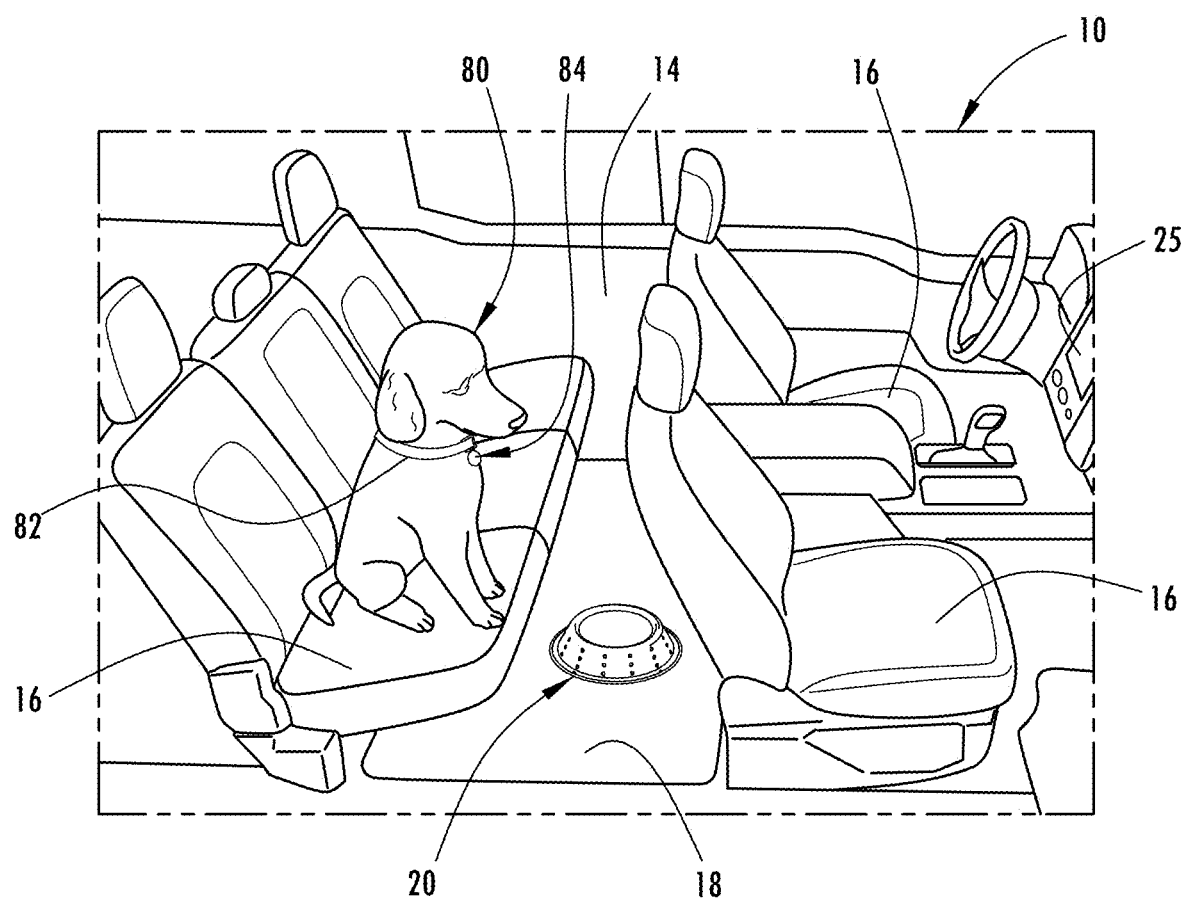
FIG. 1 is a side perspective view of a cabin interior of a vehicle containing a pet and a pet bowl, according to one example.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a pet bowl and related vehicle communications. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Figure 2:
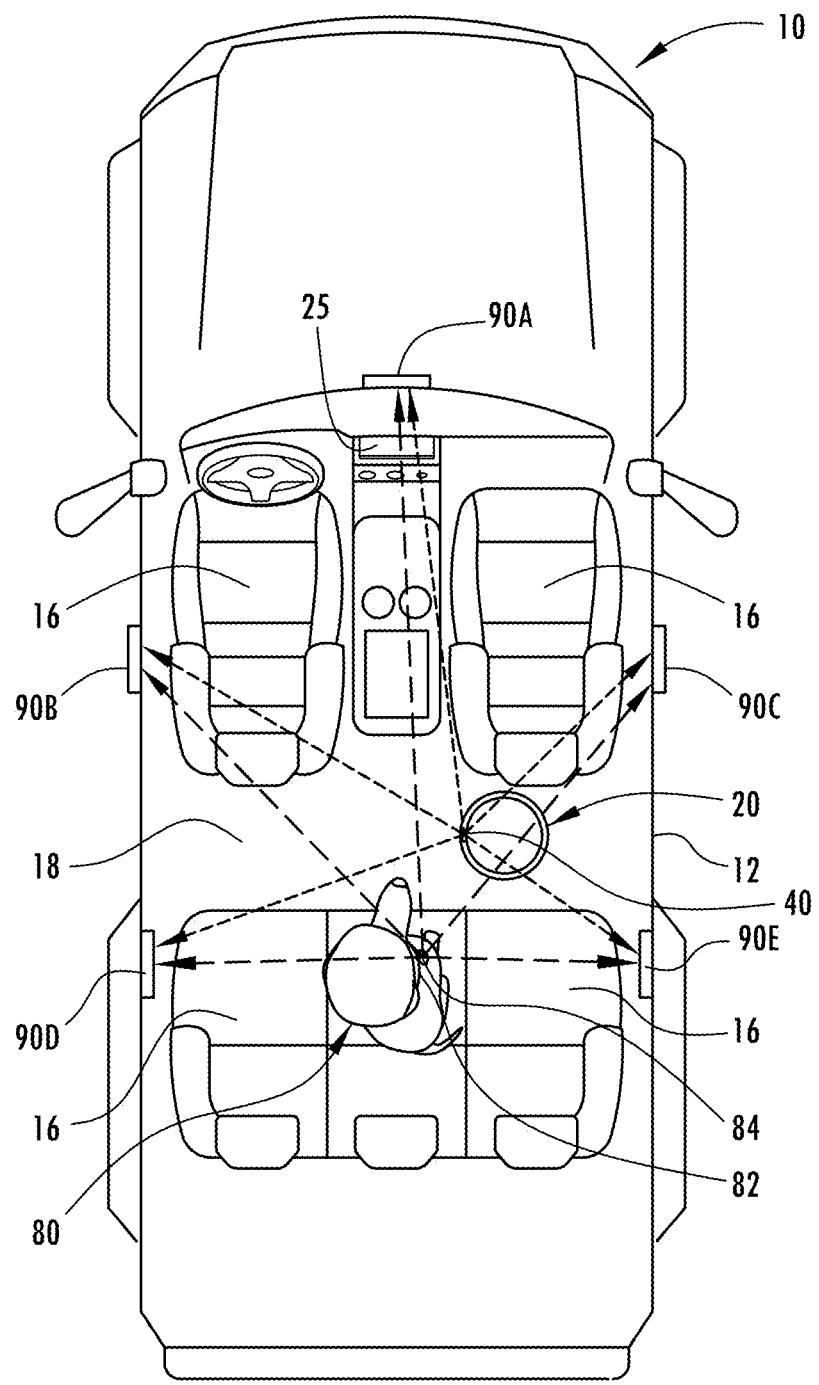
FIG. 2 is a top schematic view of the vehicle further illustrating the pet bowl and pet located within the cabin interior.

Referring to FIGS. 1 and 2, the cabin interior 14 of a wheeled automotive or motor vehicle 10 is generally illustrated configured with passenger seating and accommodations. The cabin interior 14 is generally defined by a vehicle body 12 and may contain various features and trim components within the vehicle body 12. The cabin interior 14 is shown having an arrangement of passenger seats 16 including a first or front row of driver and passenger seats and a second or rear row of seats 16 shown as bench or split bench seating. The vehicle body 12 further defines a floor 18 upon which the seating is assembled. It should be appreciated that the vehicle 10 may be a motor vehicle, such as a wheeled car, truck, SUV, van or bus, for example, or an airplane, train, boat or other vehicle.

The vehicle 10 is further shown containing a pet bowl 20 located on the floor 18 and a pet, such as a dog, shown sitting on the rear seat 16 for travel as a passenger within the cabin interior 14 of the vehicle 10. It should be appreciated that the vehicle 10 may transport any of a number of living beings, including one or more pets such as dogs and cats, for example. The pet 80 is shown wearing a collar 82 which is equipped with a radio frequency (RF) transmitter 84. The pet bowl 20 may be portable and may be located at any of a number of locations within the cabin interior 14 of the vehicle 10, at locations outside of the cabin interior 14 on the vehicle 10, and outside of the vehicle 10. The pet bowl 20 may be portable and easily transported by hand to any of a number of locations. The pet bowl 20 may rest upon the floor 18 and may be fixedly attached to the floor 18, according to one embodiment.

The vehicle 10 is configured to include a plurality of RF receivers 90A-90E positioned at different locations on board the vehicle 10. In the example shown, the vehicle 10 is equipped with five (5) RF receivers 90A-90E, however, it should be appreciated that any number of RF receivers may be employed. The RF receivers 90A-90E each may receive RF signals transmitted by one or more RF transmitters including the RF transmitter 84 located on the collar 82 of the pet 80 and an RF transmitter 40 located on the pet bowl 20. The RF receivers 90A-90E may be configured as RF transceivers which may allow for the transmission and reception of RF signals. As such, RF transceivers may receive the RF transmit signals from the RF transmitters 84 and 40 and may further transmit signals to other communication devices on board or off board the vehicle 10.

The RF transmitters 84 and 40 may be configured as RF transceivers that both transmit and receive RF signals. The RF transmitters 84 and 40 may be Bluetooth® low energy transmitters commonly operating on a frequency bandwidth of 2.4 GHz and used for wireless personal area networks, according to one example. According to another example, the RF transmitters 84 and 40 may operate in the ultrawide frequency bandwidth of 6-8 GHz.

As seen in FIG. 2, the RF transmitter 40 located on the pet bowl 20 transmits a low energy RF signal that may be received by each of the five RF receivers 90A-90E. RF receiver 90A is shown located at a position generally at the forward end of the cabin interior 14, RF receivers 90B and 90C are shown located on opposite lateral sides of the front row of seating, and RF receivers 90D and 90E are shown located on opposite lateral sides of the second row of seating. As such, each of the RF receivers 90A-90E is located in a different location separated from the other RF receivers 90A-90E. The RF signal transmit from the RF transmitter 84 is received by each of the RF receivers 90A-90E and is processed to determine a location of the pet bowl 20. According to one embodiment, this may be achieved by processing the received signal strength or amplitude of the RF signal received at each of the RF receivers 90A-90E and determining via triangulation a geographic location of the pet bowl 20. By determining the amplitude of the RF signal received by each RF receivers 90A-90E, the distance from each RF receiver to the RF transmitter can be determined. Given the relative location to each RF receiver, the location of the RF transmitter transmitting the processed signal can be determined using triangulation.

Figure 3:
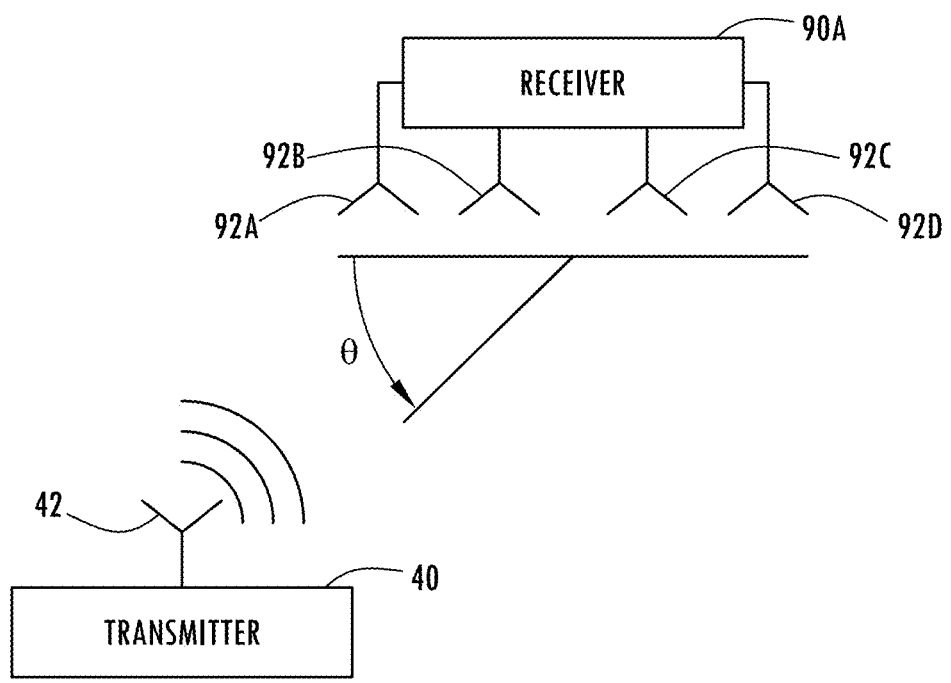
FIG. 3 is a schematic view of an RF transmitter communicating with an RF receiver to track location of the RF transmitter, according to one example.

According to another embodiment, the RF receivers 90A-90E may include a plurality of antennas that further enable determination of an approximate angle θ of arrival as shown in FIG. 3 to provide enhanced accuracy determination to the location of the RF transmitters 84 and 40 associated with the respective pet 80 and pet bowl 20. In this embodiment, RF receiver 90A is shown having a plurality of antennas, shown as four antennas 92A-92D for receiving a signal transmit from the RF transmitter 40 or 84 and determining an angle θ of arrival of the signal based on the arrangement of the plurality of antennas 92A-92D. The amplitude of the signal received at each of the RF receivers 90A-90E may further be processed to determine distance to each RF receivers and to determine an accurate position of the RF transmitter by using triangulation. RF receivers 90A-90E may likewise be configured as shown in FIG. 3. According to a further embodiment, the location of the RF transmitters may be determined based on a determined time of flight.

Similar to the RF transmitter 40 on the pet bowl 20, the RF transmitter 84 on the collar 82 of the pet 80 likewise transmits a signal to each of the RF receivers 90A-90E and each received signal is processed to determine a location of the pet 80 based on received signal strength or amplitude of each received signal, according to one embodiment. In another embodiment, the angle θ of arrival may be determined and used alone or in addition to enhance the accuracy of the determined location. Alternatively, time of flight of the RF signal may be used. As such, the pet 80 and the pet bowl 20 may be monitored and the location of the RF transmitter on each of the pet 80 and pet bowl 20 determined by the vehicle controller. The driver and passengers in the vehicle 10 may be notified of the location of each of the pet 80 and pet bowl 20 on a human machine interface (HMI), such as a vehicle display 25. The determined location of the pet 80 and pet bowl 20 may also be used to control various functions on board the vehicle 10 and off the vehicle 10.

Referring to FIGS. 4 and 5, the pet bowl 20 is illustrated, according to one embodiment. The pet bowl 20 has an exterior shape formed by angled exterior side wall 22 having holes 32 and extending in a circle and connected to a bottom rim 24 extending radially outward to the periphery. The exterior side wall 22 is angled inward from the bottom rim 24 upward according to the example shown, but may be at other angles or may be substantially vertical. The pet bowl 20 may have other shapes such as square, rectangular, hexagon, etc. The pet bowl 20 further includes an interior side wall 26 and a bottom surface 28 that define a central container 30 configured to receive content including a liquid, such as water, according to one example. It should further be appreciated that the container 30 may receive other contents, such as food. As such, the pet bowl 20 may be used to provide water or food for consumption by one or more pets.

The bottom rim 24 may have a bottom wall 35 with downward extending rubber fingers 38 provided on the bottom surface thereof to engage the underlying ground with high friction and prevent movement of the pet bowl 20 relative to the supporting ground surface, such as a vehicle floor 18, on the bottom side. The bottom rim 24 is further shown having one or more holes 34 that are configured to matingly engage one or more upward extending posts 36 such as plastic or rubber protrusions extending upwards from the floor or a floor mat thereon to further support and prevent movement of the pet bowl 20 relative to the floor 18 of the vehicle 10.

The pet bowl 20 is shown having the RF transmitter 40 located on the exterior side of interior side wall 26. The RF transmitter 40 includes an antenna 42 and an electrical power source in the form of a battery 44. The pet bowl 20 further includes a plurality of proximity sensors shown in the form of capacitive sensors 50 extending on the outer surface of the side wall 22 and onto a portion of the bottom wall 28 for sensing both a liquid level, i.e., depth, and a temperature of the water or other liquid contained in the container 30. While a plurality of capacitive sensors 50, such as six sensors, are shown spaced apart on side wall 26 and bottom wall 28, it should be appreciated that one or more capacitive sensors 50 may be employed to sense the water level and temperature of the liquid contained in the pet bowl 20. At least one or more of the capacitive sensors 50 may extend from the bottom wall 28 to a location sufficiently high enough on the side wall 26 to sense the height or depth of the water within the container 30.

The pet bowl 20 further includes temperature control circuitry 46, such as a heater and/or cooler for heating and/or cooling the contents within the container 30. The temperature control circuitry 46 is shown located on the bottom surface of the bottom wall 28, according to one example. The temperature control circuitry 46 may include heating and/or cooling circuitry electrically powered by the battery 44 to control or adjust the temperature of the liquid, e.g., water, contained within the container 30. The temperature control circuitry 46 may include a peltier heater/cooler devices, according to one example. One or more walls of the pet bowl 20 containing the liquid may be made of a thermally conductive material such as a thermally conductive plastic to allow for enhanced temperature sensing and temperature adjustment of the contained liquid via thermal conduction through the side and bottom walls. A plurality of holes 32 are shown formed in the exterior side wall 22 of the pet bowl 20 to allow air to circulate proximate to the peltier heater/cooler device and any associated cooling fins.

Figure 6:
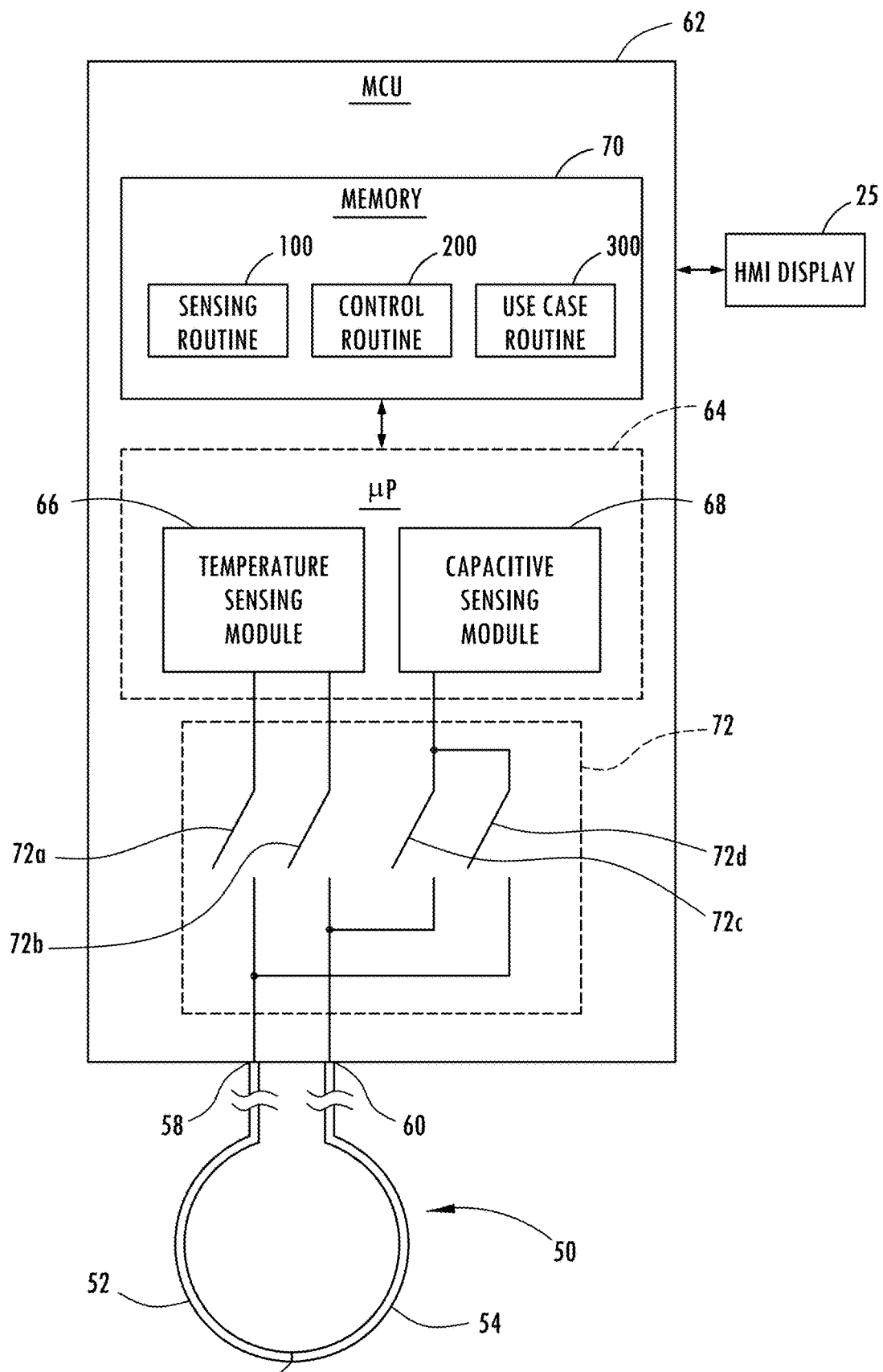
FIG. 6 is a schematic view of a capacitive sensor for sensing temperature and water level in the pet bowl, according to one embodiment.

The capacitive sensor 50 has conductive circuitry configured to sense a level of liquid, e.g., water, contained within the container 30 and to also sense the temperature of the liquid contained within the container 30 using the same conductive circuitry. One example of the capacitive sensor 50 is illustrated in FIG. 6. The capacitive sensor 50 is configured as a self-capacitance sensor having conductive circuitry made of two dissimilar metals, shown as a first metal 52 and a dissimilar second metal 54. The first metal 52 connects at a temperature sensing junction 56 to the dissimilar second metal 54. The first metal 52 and second metal 54 connect together to form a loop and serve as an electrode for the capacitive sensor 50 when operating in the capacitive liquid sensing mode. One end of the first metal 52 is connected to a controller 62, shown as a microcontrol unit (MCU). One end 60 of the dissimilar second metal 54 is also shown connected to the controller 62. The controller 62 includes a microprocessor 64 and memory 70. It should be appreciated that the controller 62 may include any analog and/or digital circuitry for processing data and executing routines 100, 200 and 300 stored in memory 70. The controller 60 may be configured to provide a temperature sensing module 66 and a capacitive sensing module 68 which may be integrated together or separately processed by the microprocessor 64. Stored within memory 70 and executed by the microprocessor 64 is the sensing routine 100, the control routine 200, and the use ease routine 300.

In the embodiment shown, the controller 60 includes switching circuitry 72 shown located within the controller 62, according to one embodiment. It should be appreciated that the switching circuitry 72 may be located external to the controller 62, according to another embodiment. The switching circuitry 72 includes a first pair of switches 72A and 72B that may open to provide an open circuit or close to provide a closed circuit to control the signal transmission between the ends 58 and 60 of the first and second metals 52 and 54, respectively, and the temperature sensing module 66 when the capacitive sensor 50 operates as a temperature sensor in the temperature sensing mode. The switching circuitry 72 also includes a first pair of switches 72C and 72D which open and close to provide a closed circuit to control the signal transmission between the first and second ends 58 and 60 of the first and second metals 52 and 54, respectively, to the capacitive sensing module 68 when the capacitive sensor 50 is configured to operate as a water level sensor in the liquid sensing mode. The controller 62 controls switches 72A-72D to switch operation of the capacitive sensor 50 between the temperature sensing operating mode and the water level sensing operating mode. For example, when the first pair of switches 72A and 72B are in the closed position, capacitive sensor 50 operates as a temperature sensor. When the second pair of switches 72C and 72D are in the closed position, capacitive sensor 50 operates in the water level sensing mode. The controller 62 may switch between closing the first pair of switches 72A and 72B and the second pair of switches 72C and 72D to switch between the two operating modes. In one example, the first pair of switches 72A and 72B may be closed briefly, e.g., 100 ms, every ten seconds to sense temperature, whereas the second pair of switches 72C and 72D may be closed for the remaining time and processed at an execution rate of 100 ms to sense water level.

The two dissimilar metals employed for the first metal 52 and second metal 54 are joined together at the temperature sensing junction 56 which may be used to sense temperature while operating in the temperature sensing mode. When the conductive circuitry in the loop is broken the net open circuit voltage referred to as the Seebeck voltage is a function of the junction temperature composition of the metals. The voltage is sensed at the ends 58 and 60. According to one example, the first metal 52 is dissimilar from the second metal 54 and the two metals may include copper/constantan (type T), iron/constantan (type J), or chrome/alumel (type K). The different metal compositions with different properties between the first and second metals 52 and 54 allow for the sensing of temperature based on the voltage sensed by the temperature sensing module 66.

The controller 62 may cycle through the capacitive liquid sensing mode and the temperature sensing mode. Because temperature typically does not change fast, the capacitive liquid level sensing may be executed at a refresh rate of 100 milliseconds, according to one example, whereas the temperature sensing may be executed at a refresh rate such as 10 seconds, according to one example. In the capacitance water level sensing mode, the lead ends 58 and 60 will be electrically shorted and connected to the same connection pin on the controller and a voltage applied to the sensor will close across the content of the pet bowl to ground. The liquid, e.g., water, contained in the container 30 has electrically conductive properties that affect the capacitive field of the capacitive sensor. This voltage will be used to determine the water level. In the thermocouple temperature sensing mode, one end 58 or 60 will be connected to the controller ground, and the other end 58 or 60 will be connected to an analog-to-digital converter (ADC) module to measure the voltage thereacross. The measured voltage is used to determine the temperature.

Figure 7:
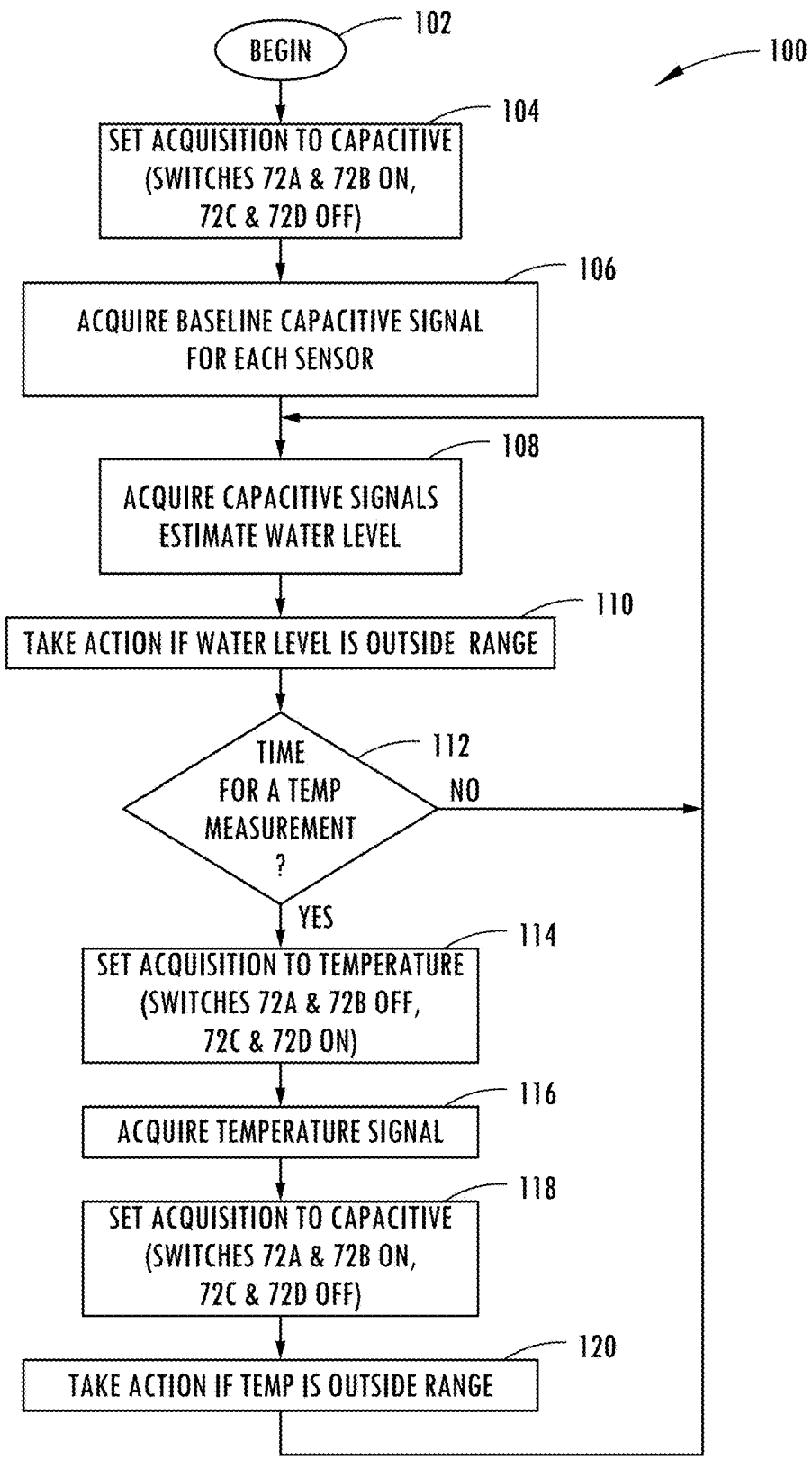
FIG. 7 is a flow diagram illustrating a sensing routine for sensing temperature and water level with the capacitive sensor, according to one example.

Referring to FIG. 7, the sensing routine 100 for sensing water level and temperature of the water in the pet bowl is illustrated, according to one example. Sensing routine 100 begins at step 102 and proceeds to step 104 to set the sensing acquisition mode to the capacitive water level sensing mode with the first pair of switches 72A and 72B switched on and the second pair of switches 72C and 72D switched off. Next, at step 106, routine 100 acquires a baseline capacitive signal for each capacitive sensor. In the example given, there are multiple sensors, and thus multiple baseline capacitive signals may be acquired. Routine 100 then proceeds to step 108 to acquire the sensed capacitive signals and determines an estimated level of the water contained within the pet bowl 20. The water level is determined as a function of the sensed capacitance since the depth of the water affects the capacitance. Routine 100 may take action such as warn the driver or passengers of a low water level or too high of a water level if the water level is outside a desired range in step 110.

Routine 100 proceeds to decision step 112 to determine if it is time for a temperature measurement, which may occur every 10 seconds, for example. If not, routine 100 returns to step 108. If it is time for the temperature measurement, routine 100 proceeds to step 114 to set the sensing acquisition mode to a temperature sensing mode with the first pair of switches 72A and 72B switched off and the second pair of switches 72C and 72D switched on. Next, at step 116, routine 100 acquires a temperature signal and then proceeds to step 118 to set the acquisition back to the capacitive water level sensing mode with switches 72A and 72B switched on and switches 72C and 72D switched off. Routine 100 determines if it is time to take action if the temperature is outside of a desired range at step 120 before returning to step 108. Routine 100 may take action such as warn the driver or passengers if the water temperature is outside a desired temperature range.

Figure 8:
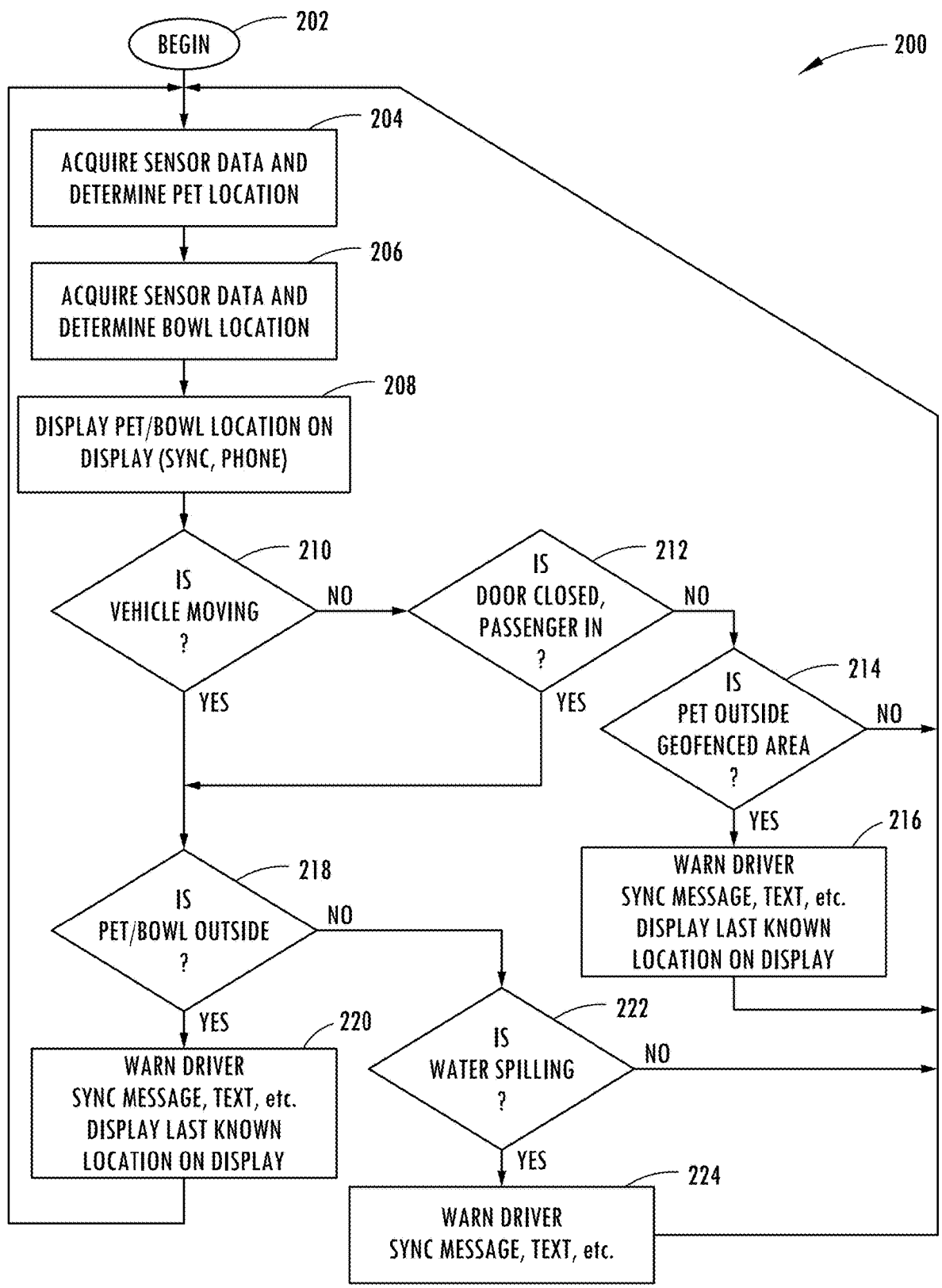
FIG. 8 is a flow diagram illustrating a control routine for controlling actions based on sensed parameters of the pet bowl, according to one example.

Referring to FIG. 8, the control routine 200 for sensing temperature and water level and communicating pet bowl information is illustrated, according to one example. Routine 200 begins at step 202 and proceeds to step 204 to acquire the sensor data and determine the pet location and then proceeds to step 206 to acquire sensor data and determines the location of the pet bowl. At step 208, routine 200 displays the location of the pet and the location of the pet bowl on a display. Routine 200 then proceeds to decision step 210 to determine if the vehicle is moving and, if not, proceeds to decision step 212 to determine if the passenger doors of the vehicle are closed and passengers are located in the vehicle. Otherwise, routine 200 proceeds to step 28. If the doors are not closed and one or more passengers are not located in the vehicle, routine 200 proceeds to step 214 to determine if the pet is located outside an area, such as a geofenced area and, if not, returns to step 204. If the pet is determined to be outside of the geofenced area, routine 200 proceeds to step 216 to warn the driver via message, text or display to provide the last known location of the pet before returning to step 204. If the vehicle is moving or if the doors are closed and one or more passengers are in the vehicle or if the pet is not outside the geofenced area, routine 200 proceeds to decision step 218 to determine if the pet bowl is located outside the vehicle and, if so, warns the driver via a message, text or display of the last known location of the pet bowl 20 at step 220. If the pet bowl 20 is not located outside, the control routine 200 proceeds to decision step 222 to determine if the water level is too high and/or is spilling from the pet bowl and, if not, returns to step 204. If the water is too high and/or spilling out of the pet bowl, routine 200 proceeds to step 224 to warn the driver via message, text or other output such as on the display.

Figure 9A:
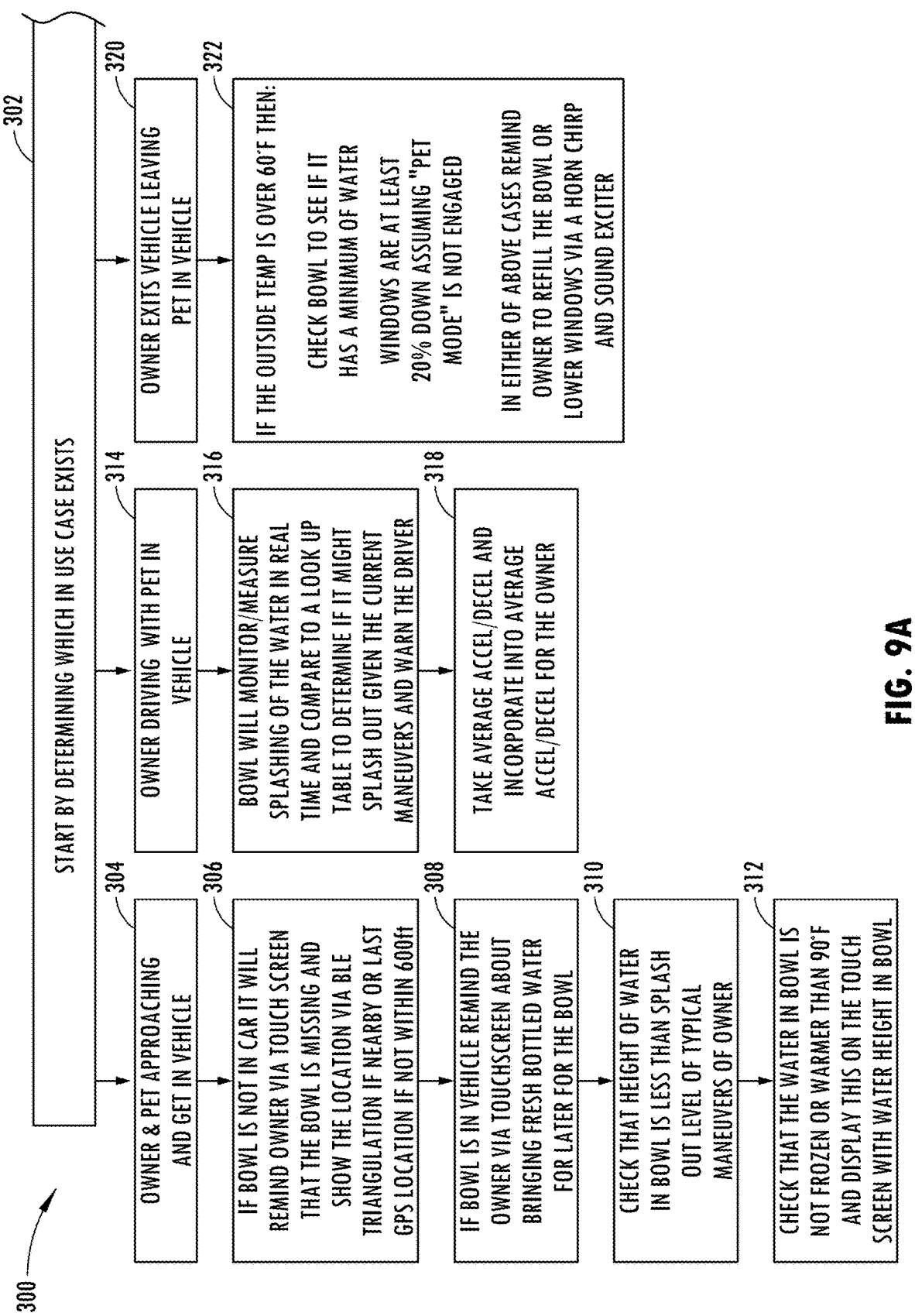
FIGS. 9A and 9B are a flow diagram illustrating control actuations for various use cases, according to one embodiment.
Figure 9B:
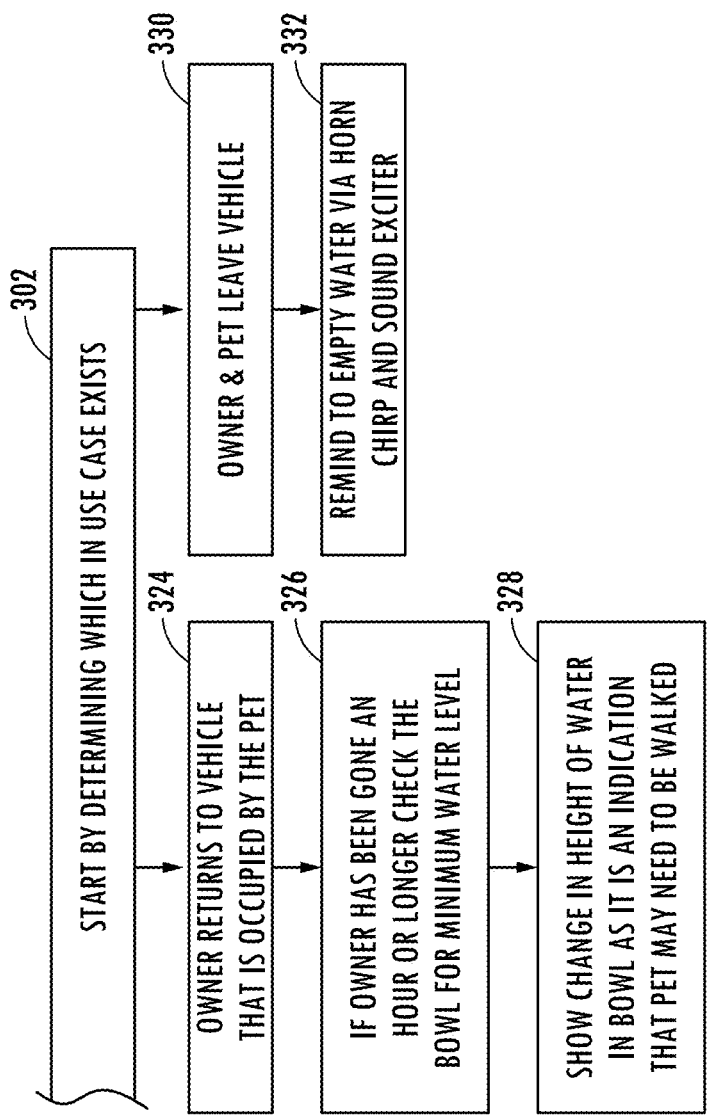

Referring to FIGS. 9A and 9B, the use case routine 300 is illustrated, according to one example. Routine 300 starts at block 302 by determining which use case scenario exists. At block 304, routine 300 detects the vehicle owner or other passenger and the pet approaching and entering the vehicle. In this use case scenario, routine 300 proceeds to step 306 to determine if the pet bowl is not in the vehicle (e.g., car), and, if so, will remind the owner via a touchscreen display that the pet bowl is missing and will show the location of the pet bowl as determined by RF signal triangulation if the pet bowl is nearby or will show the last known GPS location, based on a GPS on board the vehicle, if the pet bowl is not within a certain distance, such as 600 feet, for example. Next, at step 308, routine 300 will determine if the pet bowl is located in the vehicle and, if so, will remind the owner via the touchscreen display about the need for bringing fresh water to replenish the bowl at a later point in time or at any time. At step 310, routine 100 checks that the sensed height of the water level is less than a splash out level of typical vehicle maneuvers for the owner driving scenario. At step 312, routine checks for whether the water in the pet bowl is not frozen or is warmer than a high temperature such as 90° F. and displays the water temperature on the touchscreen display with the water height indication of the pet bowl.

In the next use case scenario, routine 300 proceeds to step 314 for the owner or passenger and pet detected driving in the vehicle use scenario. In this vehicle use scenario, routine 300 proceeds to step 316 to monitor/measure water height and/or splashing of water in the pet bowl in real time and to compare the measured water height and/or water splashing to a lookup table to determine if the water might splash out given the current vehicle driving maneuvers, and if so, warns the driver via the display or other output. Proceeding to step 318, routine 300 may measure or take an average acceleration/deceleration of the vehicle during driving and incorporate that value into an average acceleration/deceleration for the owner/driver. This may be used to set owner/driver specific threshold values.

In the use case scenario shown in block 320, routine 300 determines that the owner exits the vehicle and leaves the pet in the vehicle. In this scenario, routine 300 proceeds to step 322 to determine if the outside temperature is over a set temperature such as 60° F. and then checks to see if the pet bowl has a minimum amount of water above a predetermined level of water and determines if the windows are at least twenty percent (20%) down or open assuming a pet mode is not engaged. Routine 300 then reminds the owner to refill the pet bowl if the water level is low or to lower the window if the window is not open via an output such as an audible chirp from a sound exciter or the display.

In the use case scenario shown in block 324, routine 300 determines the owner returns to the vehicle that is occupied by the pet. In this scenario, routine 300 proceeds to step 326 to determine if the owner has been away from the vehicle for a time period such as an hour or longer and checks the pet bowl for a minimum water level. Next, at step 328, routine 300 shows the change in height of the water in the pet bowl as it is an indication that the pet may need to be let of the vehicle, such as for a walk.

In the use case scenario shown in block 330, routine 300 determines that the owner and the pet leave the vehicle. When this occurs, routine 300 proceeds to step 332 to remind the owner to empty the pet bowl via an audible alert such as through the horn, chirp or sound exciter or through the display.

Accordingly, the integrated capacitive sensor and vehicle communications advantageously allow for monitoring of the temperature and water level of water in a pet bowl and the location of the pet and pet bowl within a vehicle. Additionally, the vehicle communications enable information sensed at the pet bowl and on the pet to be communicated to the vehicle and presented to the driver or one or more passengers in the vehicle during various use case scenarios.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A pet bowl comprising:
a housing defining a container;
a proximity sensor located proximate to the container, the proximity sensor having conductive circuitry comprising a first circuit made of a first metal and a second circuit made of a dissimilar second metal; and
a controller processing signals received from the proximity sensor, the controller selectively switching the conductive circuitry between a first configuration operating as the proximity sensor to sense an amount of content contained in the container and a second configuration operating as a thermocouple to sense temperature of the content of the container.

2. The pet bowl of claim 1, wherein the container comprises thermally conductive material.

3. The pet bowl of claim 2, wherein the thermally conductive material comprises thermally conductive plastic.

4. The pet bowl of claim 1 further comprising a wireless transmitter for communicating with a controller onboard a vehicle.

5. The pet bowl of claim 4, wherein the wireless transmitter comprises an RF transmitter.

6. The pet bowl of claim 1 further comprising one or more batteries for providing electrical power to the controller and proximity sensor.

7. The pet bowl of claim 1, wherein the proximity sensor comprises a capacitive sensor.

8. The pet bowl of claim 7, wherein the temperature is sensed at a junction of the first and second circuits.

9. The pet bowl of claim 1, wherein the controller generates an output based on at least one of a sensed water level and temperature.

10. The pet bowl of claim 9, wherein the output is indicative of at least one of the sensed water level and temperature.

11. The pet bowl of claim 9, wherein the output controls a heater or cooler to adjust the temperature of the water in the container.

12. A pet bowl for use on a vehicle, the pet bowl comprising:
- a housing defining a water container;
- a capacitive sensor located proximate to the water container, the capacitive sensor having conductive circuitry comprising a first circuit made of a first metal and a second circuit made of a dissimilar second metal; and
- a controller processing signals received from the capacitive sensor, the controller selectively switching the conductive circuitry between a first configuration operating as the capacitive sensor to sense water level in the water container and a second configuration operating as a thermocouple to sense temperature of water in the container.

13. The pet bowl of claim 12, wherein the water container comprises thermally conductive material.

14. The pet bowl of claim 13, wherein the thermally conductive material comprises thermally conductive plastic.

15. The pet bowl of claim 12 further comprising a wireless transmitter for communicating with a controller onboard the vehicle.

16. The pet bowl of claim 15, wherein the wireless transmitter comprises an RF transmitter.

17. The pet bowl of claim 12 further comprising one or more batteries for providing electrical power to the controller and proximity sensor.

18. The pet bowl of claim 12, wherein the temperature is sensed at a junction of the first and second circuits.

19. The pet bowl of claim 12, wherein the controller generates an output based on at least one of the sensed water level and temperature.

20. The pet bowl of claim 19, wherein the output controls a heater or cooler to adjust the temperature of the water.

* * * * *